United States Patent
Qi et al.

(10) Patent No.: US 12,100,220 B2
(45) Date of Patent: Sep. 24, 2024

(54) COOPERATIVE PSEUDO POINT CLOUD FOR CONNECTED VEHICLES

(71) Applicant: Toyota Motor Engineering & Manufacturing North America, Inc., Plano, TX (US)

(72) Inventors: Xuewei Qi, Mountain View, CA (US); Rui Guo, San Jose, CA (US); Prashant Tiwari, Santa Clara, CA (US); Chang-Heng Wang, Cupertino, CA (US); Takayuki Shimizu, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 444 days.

(21) Appl. No.: 17/490,354

(22) Filed: Sep. 30, 2021

(65) Prior Publication Data
US 2023/0098141 A1 Mar. 30, 2023

(51) Int. Cl.
*G06T 15/00* (2011.01)
*B60W 40/09* (2012.01)
(Continued)

(52) U.S. Cl.
CPC ............ *G06V 20/56* (2022.01); *B60W 40/09* (2013.01); *G06F 18/213* (2023.01);
(Continued)

(58) Field of Classification Search
CPC . G06T 7/50–7/596; G06T 2207/10028; G06T 3/00–3/608;
(Continued)

(56) References Cited

U.S. PATENT DOCUMENTS 8,781,731 B2 7/2014 Lo et al.
10,474,161 B2 11/2019 Huang et al.
(Continued)

FOREIGN PATENT DOCUMENTS

DE 102006036933 A1 2/2008

OTHER PUBLICATIONS

Zhu et al., "Point Cloud Registration using Representative Overlapping Points", arXiv:2107.02583 [cs.CV], Computer Vision and Pattern Recognition (cs.CV), Tue, Jul. 6, 2021, 2 bib pages and article pp. 1-18. (Year: 2021).*

(Continued)

*Primary Examiner* — Brian Werner
(74) *Attorney, Agent, or Firm* — Christopher G. Darrow; DARROW MUSTAFA PC

(57) ABSTRACT

System, methods, and embodiments described herein relate to dynamically generating a wide field-of-view three-dimensional pseudo point cloud of an environment around a vehicle. A disclosed method may include capturing, via a camera, a first view in a first image, determining a first depth map based on the first image, obtaining, from an external system, a second image of a second view that overlaps the first view and a second depth map based on the second image, inputting the first image and the second image into a self-supervised homograph network that is trained to output a homographic transformation matrix between the first image and the second image, and generating a three-dimensional pseudo point cloud that combines the first depth map and the second depth map based on the homographic transformation matrix.

20 Claims, 7 Drawing Sheets

(51) Int. Cl.
*G06F 18/213* (2023.01)
*G06F 18/214* (2023.01)
*G06V 20/56* (2022.01)
*H04W 4/46* (2018.01)

(52) U.S. Cl.
CPC ............ *G06F 18/214* (2023.01); *H04W 4/46* (2018.02); *B60W 2420/403* (2013.01); *B60W 2420/408* (2024.01); *B60W 2554/4048* (2020.02)

(58) Field of Classification Search
CPC .......... G06T 2207/30248–2207/30264; G05D 1/0246–1/0253; G05D 1/0088; G06V 20/56–20/588; B60W 30/08–30/0956; G08G 1/16–1/168; G06N 3/02–3/126
See application file for complete search history.

(56) References Cited

U.S. PATENT DOCUMENTS

| | | |
|---|---|---|
| 10,649,461 B2 | 5/2020 | Han et al. |
| 2002/0196340 A1 | 12/2002 | Kato et al. |
| 2015/0109444 A1 | 4/2015 | Zhang et al. |
| 2020/0254931 A1 | 8/2020 | Herman |
| 2021/0132612 A1* | 5/2021 | Wang ................... G08G 5/0013 |

OTHER PUBLICATIONS

Detone et al., "Deep Image Homography Estimation," arXiv:1606.03798, Jun. 13, 2016, pp. 1-6.

Lin et al., "ST-GAN: Spatial Transformer Generative Adversarial Networks for Image Compositing," Proceedings of the IEEE Conference on Computer Vision and Pattern Recognition (CVPR), 2018, pp. 9455-9464.

Weng et al., "Monocular 3D Object Detection with Pseudo-LiDAR Point Cloud," Proceedings of the IEEE/CVF International Conference on Computer Vision (ICCV), 2019, pp. 1-10.

Guizilini et al., "Full Surround Monodepth from Multiple Cameras," arXiv:2104.00152, Mar. 31, 2021, pp. 1-14.

\* cited by examiner

COOPERATIVE PSEUDO POINT CLOUD FOR CONNECTED VEHICLES

TECHNICAL FIELD

The subject matter described herein relates, in general, to a system and method for reconstructing a three-dimensional (3D) driving environment, and more particularly, to learning and estimating relative poses of cameras of two different vehicles through a homography transformation learning network with a spatial self-attention mechanism in order to transform and stitch a pseudo point cloud from a sender vehicle with that of a receiver vehicle.

BACKGROUND

Three-dimensional (3D) sensing and reconstruction is an essential functional component for autonomous driving system. More specifically, 3D sensing and reconstruction is a foundational component for perception, localization and high definition (HD) mapping. Conventional environment sensing systems can derive a point cloud based on depth information obtained from a LIDAR sensor or obtain a pseudo point cloud based on a depth estimation from camera images as a way of obtaining dense 3D representation (e.g., a 3D point cloud) of the surrounding environment. Such estimation techniques can be cost-effective compared to expensive LiDAR sensors. However, current depth estimation and pseudo point cloud models for automotive applications have significant limitations and short-comings, such as limited field-of-view (FOV), limited reconstruction range or inadequate accuracy or implementation costs.

SUMMARY

The disclosed systems and methods relate to efficient and cost-effective techniques for reconstructing a 3D driving environment by generating a pseudo point cloud with a wider field-of-view by stitching multiple sensing regions of images obtained from nearby connected vehicles on roads through vehicle-to-vehicle (V2V), vehicle-to-everything (V2X), or another wireless communication protocol.

The disclosed systems and methods are capable of directly learning and estimating relative poses of cameras from two different vehicles through a homography transformation learning network with spatial self-attention mechanism. The estimated relative pose is leveraged to transform and stitch a generated dense pseudo point cloud from a transmitter vehicle with that of a receiver vehicle. This pipeline can be implemented in one single deep neural network and can be trained in an end-to-end manner.

In one embodiment, a system includes a camera, a processor and a memory communicably coupled to processor. The memory can store machine-readable instructions that, when executed by the processor, cause the processor to capture, via the camera, a first view in a first image, determine a first depth map based on the first image, obtain, from an external system, a second image of a second view that overlaps the first view and a second depth map based on the second image, input the first image and the second image into a self-supervised homograph network that is trained to output a homographic transformation matrix between the first image and the second image, generate a three-dimensional pseudo point cloud that combines the first depth map and the second depth map based on the homographic transformation matrix.

In another embodiment, a method includes capturing, via a camera, a first view in a first image, determining a first depth map based on the first image, obtaining, from an external system, a second image of a second view that overlaps the first view and a second depth map based on the second image, inputting the first image and the second image into a self-supervised homograph network that is trained to output a homographic transformation matrix between the first image and the second image, and generating a three-dimensional pseudo point cloud that combines the first depth map and the second depth map based on the homographic transformation matrix.

In yet another embodiment, a non-transitory computer-readable medium includes instructions that, when executed by a processor, causes the processor to capture, via a camera, a first view in a first image, determine a first depth map based on the first image, obtain, from an external system, a second image of a second view that overlaps the first view and a second depth map based on the second image, input the first image and the second image into a self-supervised homograph network that is trained to output a homographic transformation matrix between the first image and the second image, and generate a three-dimensional pseudo point cloud that combines the first depth map and the second depth map based on the homographic transformation matrix.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and embodiments associated with a generating a pseudo point cloud as a 3D representation of a local environment of a vehicle are disclosed. The disclosed embodiments can generate the pseudo point cloud based on information obtained from a plurality of images that capture overlapping views of the environment.

As referred to herein, the term "ego vehicle" or "receiver vehicle" refers to a subject vehicle that captures images, obtains additional images from an external system (e.g., a different vehicle or in some instances a road-side unit or another external camera system), and utilizes the disclosed systems and methods to generate the pseudo point cloud, e.g., to aid in navigation, obstacle avoidance, lane changes, etc., of the subject vehicle.

As referred to herein, the term "connected vehicle" or "transmitter vehicle" refers to a vehicle other than the ego vehicle that is equipped with one or more sensors (e.g., cameras, etc.) and equipped with or connected to a wireless communication system that can transmit/receive data to communicate with the ego vehicle.

Generally, in the disclosed embodiments an ego vehicle is equipped with a sensor (e.g., a camera) that can capture an image showing a view of a local environment of the vehicle. The field of view (FoV) of the image is limited, e.g., due to limitations of the lens settings of the camera. In some situations the FoV may be limited further still by obstructions in the environment. As an example, a front-facing camera on an ego vehicle may capture a front view of the vehicle but not capture peripheral or rear views of the vehicle or views obstructed by neighboring trucks or other vehicles.

The disclosed embodiments overcome the problems of a limited FoV and provide a 3D representation in a cost-efficient manner by utilizing cameras and connected vehicles without the need for employing relatively expensive LIDAR sensor systems. The disclose embodiments enable an ego vehicle to capture images, obtain additional images from one or more other vehicles in the same locality and use these images in combination to generate a dense pseudo point cloud of the environment with a wide FoV.

More specifically, the disclosed embodiments are capable of directly learning and estimating relative poses of cameras from two different vehicles through a novel homography transformation learning network with a spatial self-attention mechanism. The disclosed embodiments leverage the relative pose estimates to transform and stitch a generated dense pseudo point cloud based on images captured by a transmitter vehicle with images captured by a receiver vehicle. In one or more embodiments, the disclosed pipeline is implemented in one single deep neural network that can be trained in an end-to-end manner.

Figure 1:
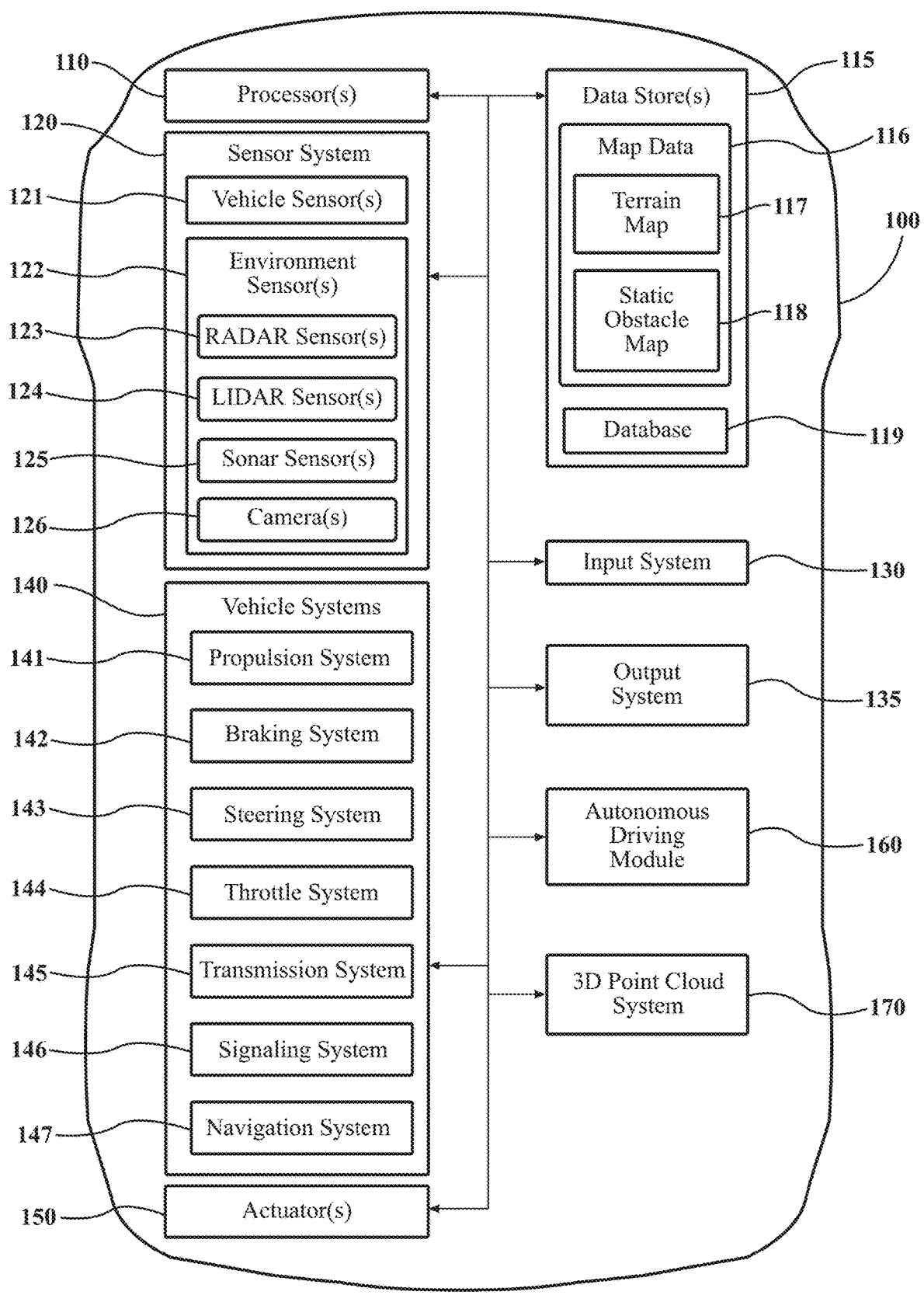
FIG. 1 illustrates one embodiment of a vehicle within which systems and methods disclosed herein may be implemented.

Referring to FIG. 1, an example of a vehicle 100 that can implement the disclosed 3D point cloud system 170 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any form of powered transport or vehicle that, for example, may have autonomous, semi-autonomous, or guidance systems that require accurate environmental data for path planning and navigation and thus can benefit from the functionality discussed herein.

As shown in FIG. 1, the vehicle 100 includes multiple elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a more detailed description of many of the elements in FIG. 1 will be provided after the discussion of FIGS. 2-7 for purposes of brevity in this description. It will be appreciated that for simplicity and clarity of illustration, where appropriate, reference numerals have been repeated among the different figures to indicate corresponding or analogous elements. In addition, while the discussion outlines numerous specific details to provide a thorough understanding of the embodiments described herein, those of skill in the art, will understand that the embodiments described herein may be practiced using various combinations of these elements.

In any case, the vehicle 100 includes camera(s) 126 that functions to capture first image data and a 3D point cloud system 170 that functions to receive second image data from an external source (e.g., a connected vehicle), provide both the first and the second image data as input to an end-to-end homography transformation learning network for estimating an accurate homograph transformation matrix between the two images based on overlapped features and, given the estimated transformation matrix, form a complete pseudo point cloud with a wider FoV. Moreover, while depicted as a standalone component, in one or more embodiments, the 3D point cloud system 170 can be integrated with another component of the vehicle 100, such as the autonomous driving module 160 or other drive control system of the vehicle 100 to control or aid in control of driving operations of the vehicle 100. Furthermore, in one or more embodiments the system 170 can be implemented in a cloud server or edge computing device in communication with the vehicle 100. The disclosed functions and methods will become more apparent in the following discussion of the figures.

Figure 2:
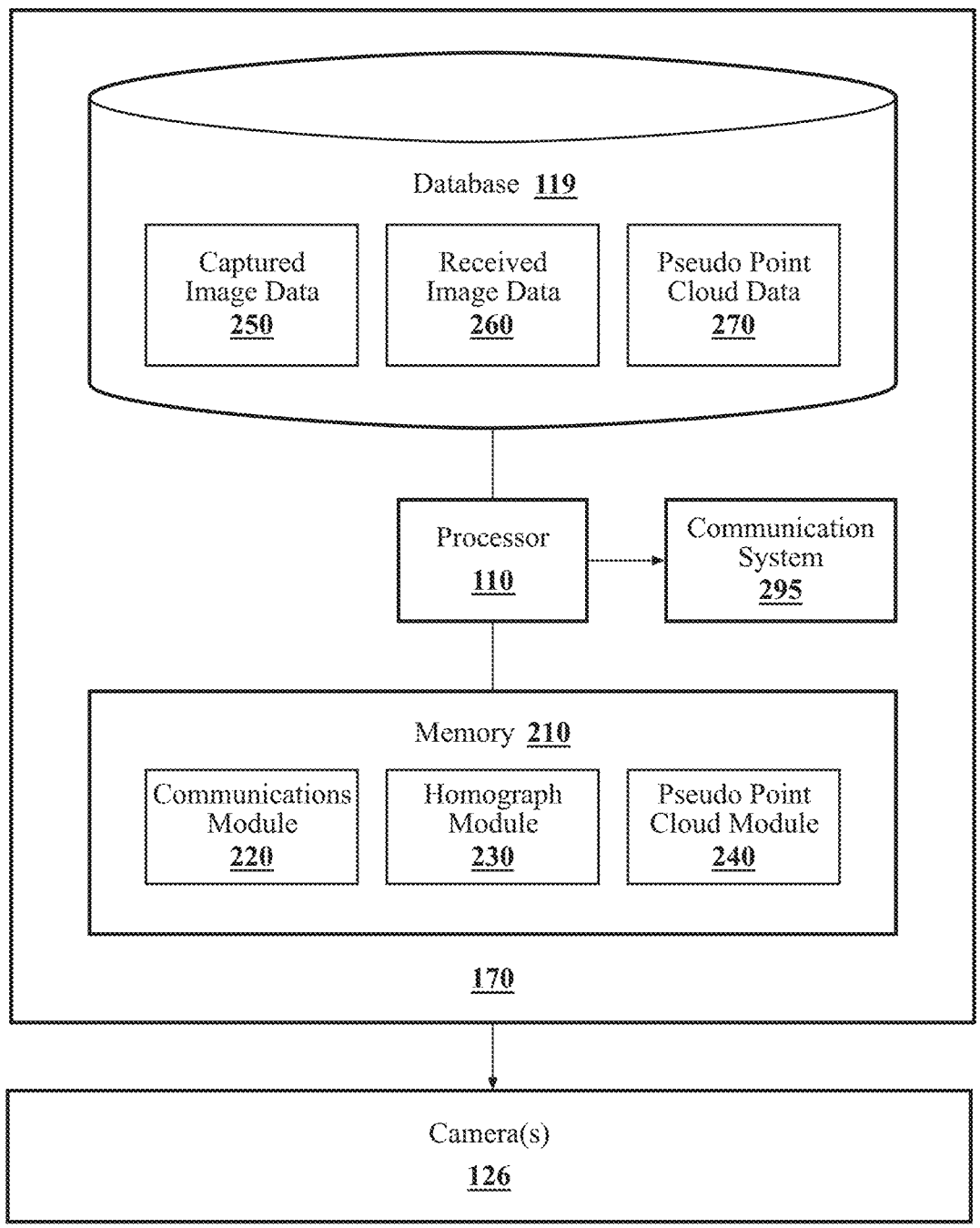
FIG. 2 illustrates one embodiment of a 3D point cloud system, according to the disclosed embodiments.

With reference to FIG. 2, one embodiment of an implementation of the 3D point cloud system 170 of FIG. 1 is illustrated. The 3D point cloud system 170 is shown communicably connected to the camera(s) 126 and including a processor 110 and database 119 from the vehicle 100 of FIG. 1. Accordingly, the processor 110 may be a part of the 3D point cloud system 170, the 3D point cloud system 170 may include a processor separate from the processor 110 of the vehicle 100 or the 3D point cloud system 170 may access the processor 110 through a data bus or another communication path.

The 3D point cloud system 170 can include a database 119 that stores, among other things, captured image data 250 (e.g., images captured by the camera(s) 126), received image data 260 (e.g., images captured by cameras of an external system, such as another vehicle, and transmitted to the vehicle 100) and pseudo point cloud data 270 (e.g., generated pseudo point cloud with wide FoV), as will be discussed further below. The database 119, in one embodiment, is constructed as an electronic data structure stored in the memory 210 or another data store, such as the vehicle 100 data store 115, a cloud-based storage, a removable memory device, or another suitable location that is accessible to the modules 220, 230, and 240. The database 119 is configured with routines that can be executed by the processor 110 for analyzing stored data, providing stored data, organizing stored data, and so on. Thus, in one embodiment, the database 119 stores data described above (as well as other data) used by the modules 220, 230, and 240 in executing various functions.

Additionally, the 3D point cloud system 170, in one or more embodiments, includes a memory 210 that stores a communications module 220, a homograph module 230, and a pseudo point cloud module 240. The memory 210 can be constructed as a random-access memory (RAM), read-only memory (ROM), a hard-disk drive, a flash memory, or other suitable memory for storing the modules 220, 230, and 240. The modules 220, 230 and 240 are, for example, constructed as computer-readable instructions that when executed by the processor 110 cause the processor 110 to perform the various functions disclosed herein.

The 3D point cloud system 170 can include a communication system 295 to communicate with other vehicles and/or external computing devices, for example, to obtain received image data 260 as will be discussed further below. The communication system 295 can be implemented as, for example, a wireless communication system including one or more transmitting/receiving devices, one or more transmitting/receiving antennas and a controller for transmitting and receiving data over a wireless network using any of a variety of protocols, such as mmWave Radio, vehicle-to-vehicle (V2V), vehicle-to-everything (V2X), general packet radio service (GPRS), Universal Mobile Telecommunications System (UMTS), Code Division Multiple Access 2000 (CDMA2000), CDMA2000 1x (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), Wibree, and/or any other wireless protocol. In one or more embodiments, the communication system 295 can be configured to receive data from one or more external entities, such as other vehicles, road-side units (RSUs), cloud servers, edge servers, stationary cameras, etc.

The communications module 220 is generally constructed including instructions that function to control the processor 110 to communicate wirelessly via the communication system 295 with an external system, e.g., nearby vehicles, to obtain received image data 260. In one or more embodiments, the communications module 220 establishes a communication channel with a nearby vehicle using V2V communications protocols. In one or more embodiments, the received image data 260 includes a captured image and one or more of: a raw image, a depth map of the image, and GPS/MU readings associated with the location of capture of the image. The view captured in the received image data 260 at least partially overlaps a view captured in the captured image data 250 obtained from the camera(s) 126.

The homograph module 230 is generally constructed including instructions that function to control the processor 110 to input a first image (i.e., from captured image data 250) and a second image (i.e., from received image data 260) into a self-supervised homograph network that is trained to output a homographic transformation matrix between the first image and the second image.

The pseudo point cloud module 240 is generally constructed including instructions that function to control the processor 110 to generate a pseudo point cloud that combines the first depth map and the second depth map, based on the homographic transformation matrix, in a wide FoV.

Figure 3:
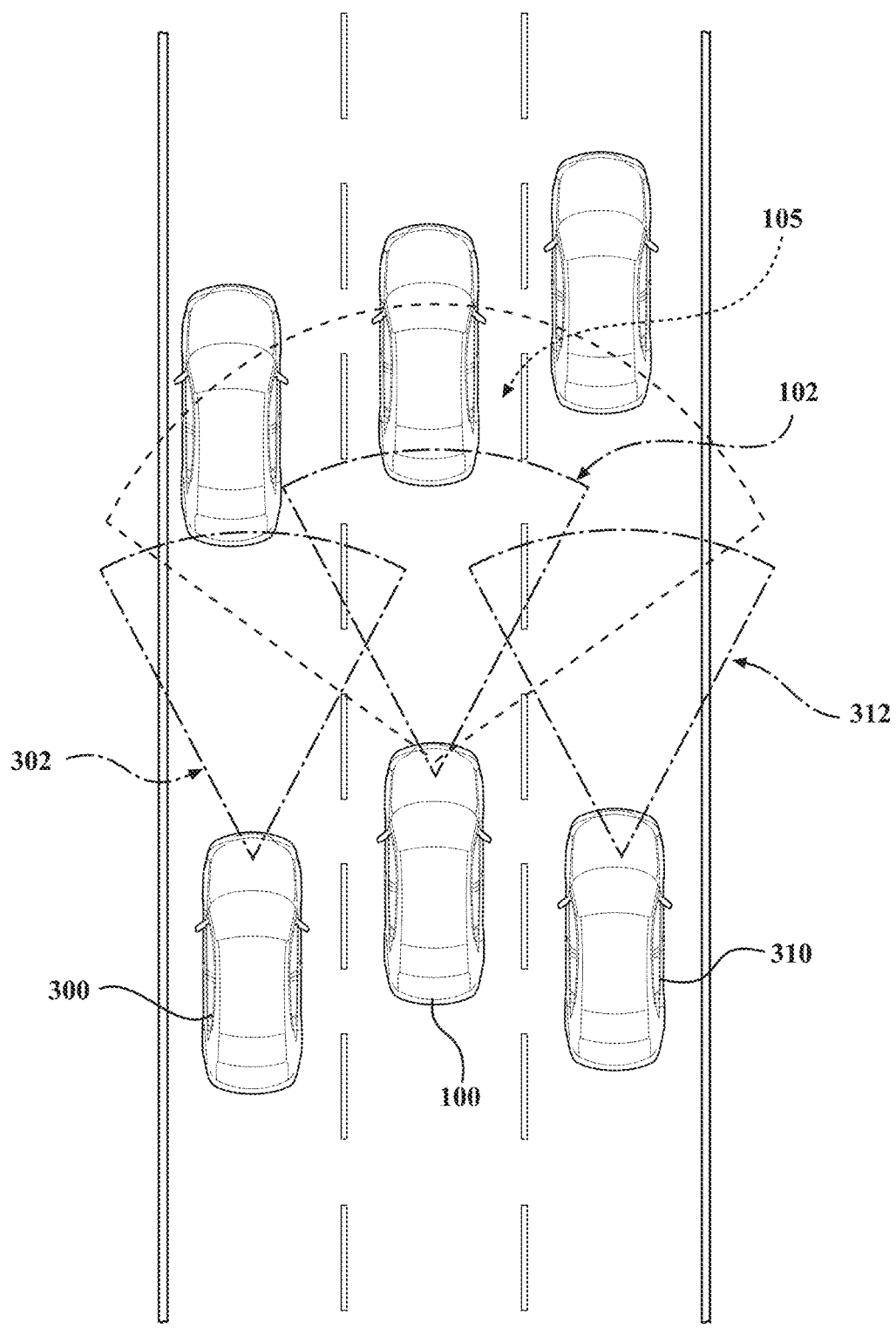
FIG. 3 illustrates an example situation in which a 3D point cloud system may be implemented, according to the disclosed embodiments.

FIG. 3 illustrates an example situation in which the disclosed subject matter may be implemented. In this example, connected vehicles 300, 310 are traveling within a vicinity of ego vehicle 100. The ego vehicle 100 includes a front-facing camera that captures a view 102. Connected vehicle 300 can include a front-facing camera that captures a view 302 that overlaps with view 102. Similarly, connected vehicle 310 can include a front-facing camera that captures a view 312 that overlaps with view 102. The connected vehicles 300, 310 can transmit image data capturing their respective views to the 3D point cloud system 170. Based on the captured image data 250 and the received image data 260, the 3D point cloud system 170 can generate a pseudo point cloud having a view 105 with a wider FoV than would be possible by the ego vehicle 100 alone.

Figure 4:
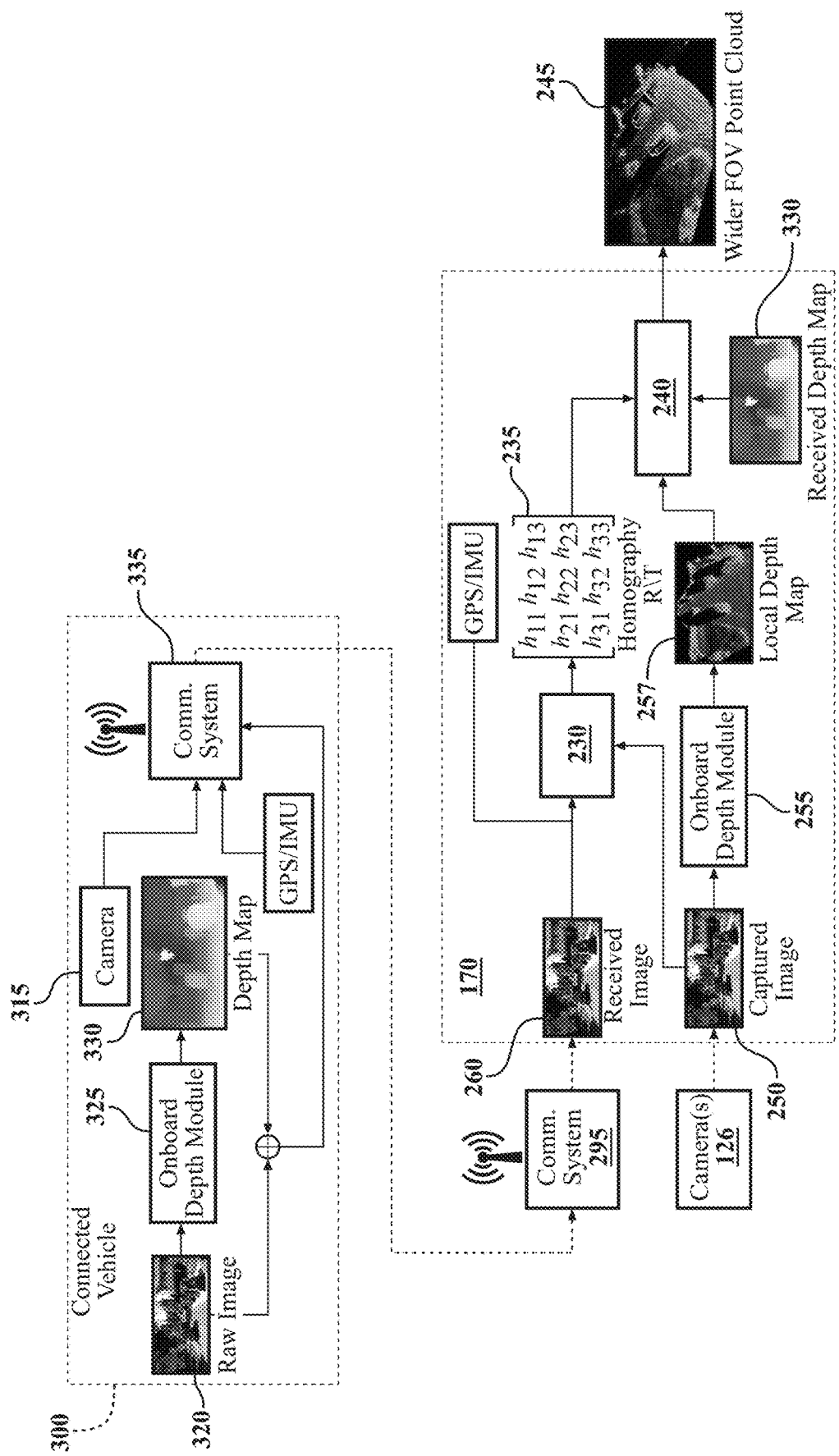
FIG. 4 illustrates an example implementation of the disclosed subject matter showing processing and interactions between a connected vehicle and an ego vehicle, according to the disclosed embodiments.

FIG. 4 illustrates an example implementation of the disclosed embodiments showing processing and interactions between a connected vehicle 300 and the ego vehicle. For simplicity of discussion the example shows interactions between a single connected vehicle 300 and the ego vehicle, however, it should be understood that the disclosed embodiments may be scaled and applied to interactions between multiple connected vehicles and an ego vehicle.

As shown in FIG. 4, the connected vehicle 300 captures an image 320 with a camera 315. The connected vehicle 300 extracts a depth map 330 (e.g., a dense pseudo point cloud) of the image 320 from its onboard depth module 325 and transmits the image 320, depth map 330 and optionally the corresponding GPS/IMU readings to the ego vehicle (i.e., 3D point cloud system 170) through a wireless communication system 335 (e.g., V2V, mmWave radio, etc.).

The 3D point cloud system 170 receives image data 260, which includes the image 320, corresponding depth map 330 and optionally includes corresponding GPS/IMU readings. The camera(s) 126 captures an image 250, and an onboard depth module 255 obtains a local depth map (e.g., a dense pseudo point cloud) based on the captured image 250. The 3D point cloud system 170 (e.g., homograph module 230) inputs the received image 260 and the captured image 250 to a self-supervised homograph network for estimating a homograph transformation matrix 235 between the two images based on overlapping features. Based on the transformation matrix 235, the 3D point cloud system 170 (e.g., pseudo point cloud module 240) stitches the locally generated depth map 257 with the received depth map 330 to form a complete pseudo point cloud 245 with wider FoV that would have been possible based on the captured image 250 alone. This final pseudo point cloud 245 can be used for different autonomous, semi-autonomous, or guidance related vehicle tasks, such as 3D object detection and HD mapping.

Figure 5:
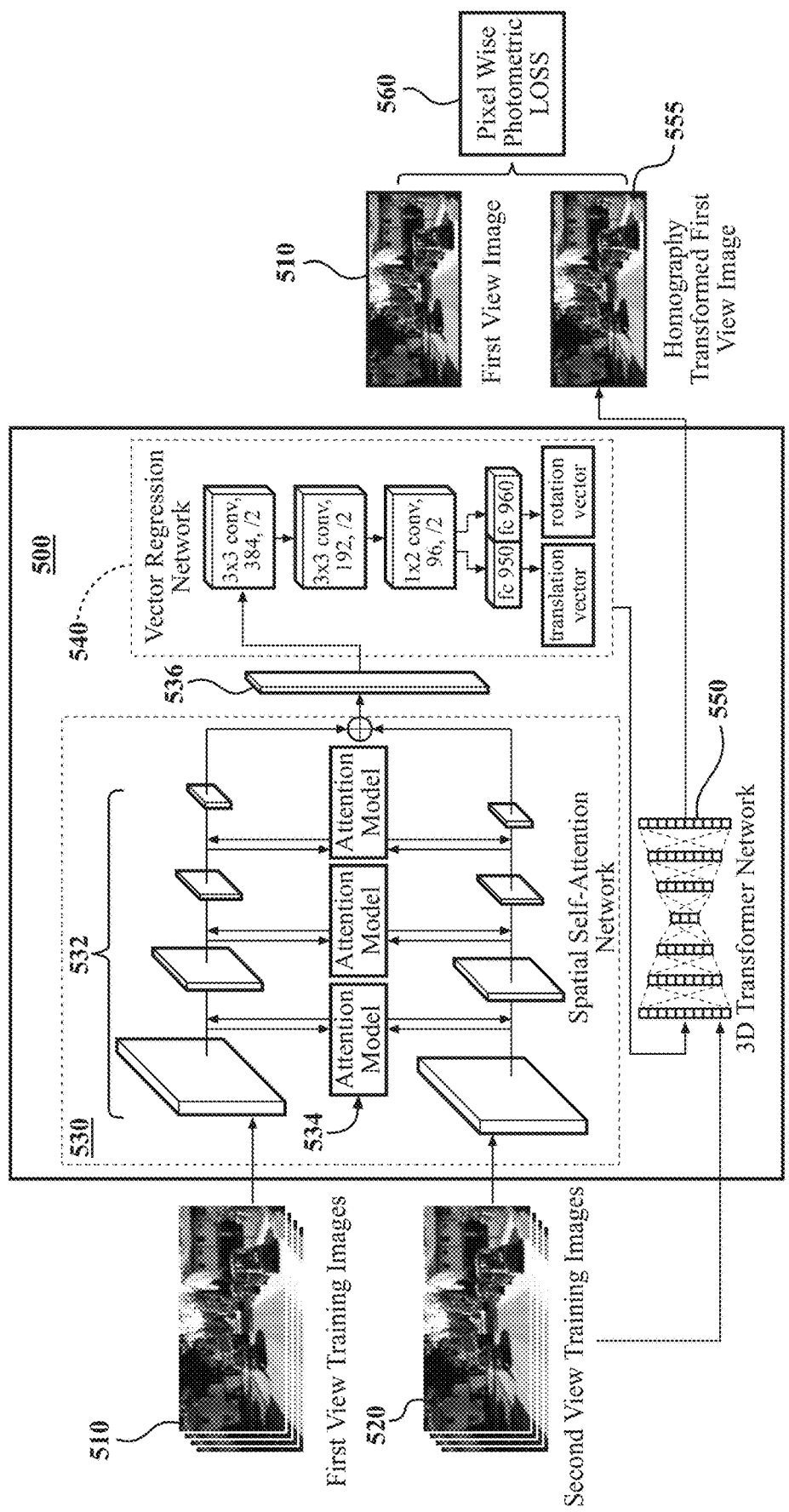
FIG. 5 illustrates details showing how a self-supervised homograph network can be trained for estimating an accurate homograph transformation matrix, according to the disclosed embodiments.

FIG. 5 illustrates an embodiment of details showing how the self-supervised homograph network 500 used by the homograph module 230 can be trained for estimating an accurate homograph transformation matrix. In a training mode, a set of first training images 510 capturing a first view and a set of second training images 520 capturing a second view that overlaps with the first view are both successively fed in pairs to a spatial self-attention network 530. The spatial self-attention network 530 can learn a feature vector that indicates which part of each image pair is important for transformation estimation.

In one or more embodiments, the spatial self-attention network 530 convolves each pair of input images through a plurality of convolution stages in a plurality of convolution layers 532 to successively reduce scale. At each convolution stage, an attention model 534 learns which portion of the convolution is most important for determining difference features that indicate differences between the first image and the second image convolutions.

Figure 6:
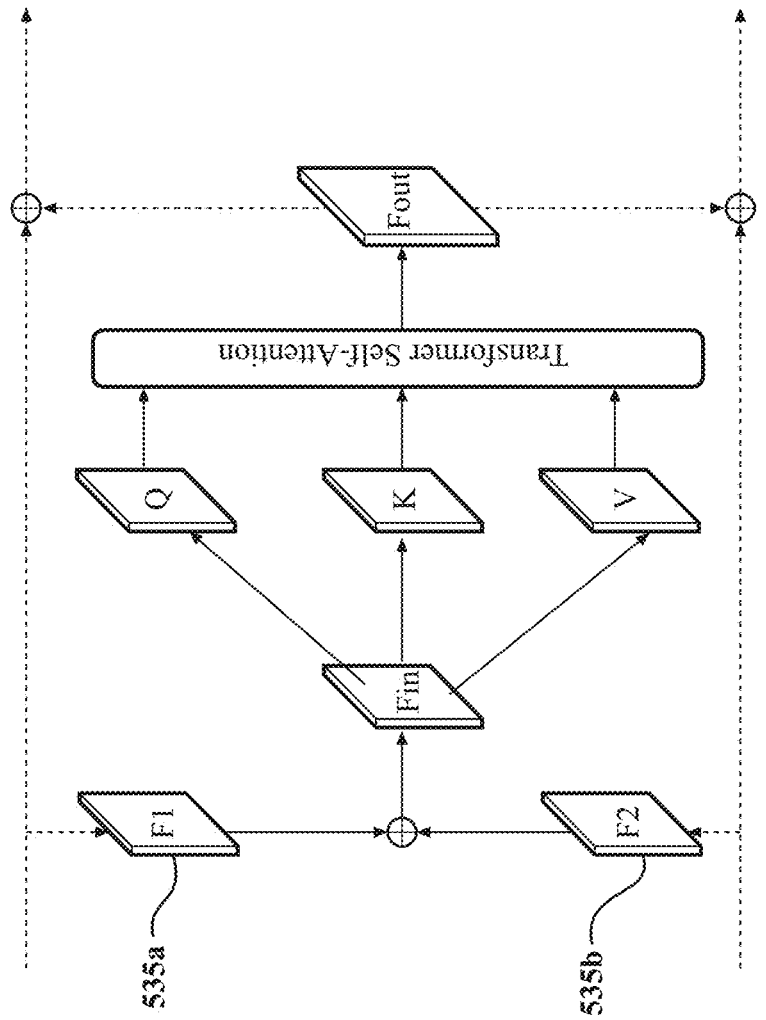
FIG. 6 illustrates an example structure of an attention model, according to the disclosed embodiments.
Figure 6:
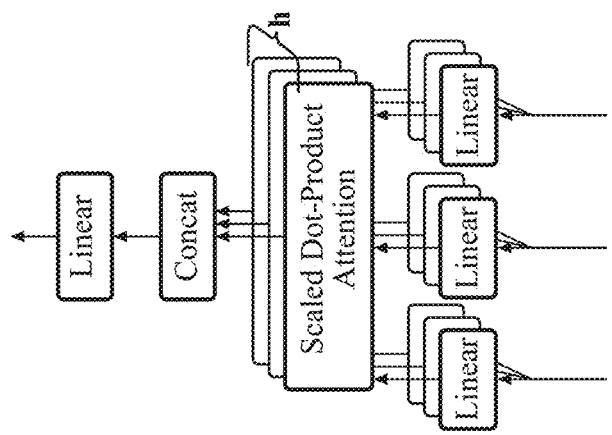

FIG. 6 shows an example structure of the attention model 534. In one or more embodiments, the attention model 534 is implemented using an attention-based transformer (e.g., encoder-decoder) model that receives a first feature 535a and a second feature 535b from the captured image 250 and received image 260, respectively, to learn the most important part of the overlapping portions for transformation estimation.

Referring back to FIG. 5, the spatial self-attention network 530 combines the difference features into a single vector which forms the feature vector 536. The feature vector 536 is concatenated as the input to a vector regression network 540 which regresses a rotation vector and translation vector of a relative pose of the camera that captured the second image 520. With these two vectors, a 3D transformer network 550 then projects the second image 520 back into the first image 510 space to form a homography transformed first view image 555 and compute a pixel-wise photometric loss 560 at the common view regions.

By determining the pixel-wise photometric loss 560, the self-supervised homograph network 500 can be trained in an end-to-end manner with a photometric loss function. The photometric loss function calculates a distance between transformed pixel level features (i.e., from the homography transformed first view image 555) and ground truth pixel level features (i.e., from the first image 510) within the common/overlapped field of view. End-to-end adjustments reducing the photometric loss function over the course of training improves the performance of the self-supervised homograph network 500.

Thus, the disclosed system 170 can dynamically (i.e., in real time) generate a wide FoV 3D pseudo point cloud of a driving environment for a vehicle that has a camera equipped and do so without additional costs involving utilization of a LIDAR sensor system. The disclosed system 170 can provide a wide 3D reconstruction of the environment based on common/overlapped FoVs sensed by multiple vehicles and improve 3D reconstruction completeness by observing a same object from different views by cameras from different vehicles nearby. Furthermore, the disclosed system 170 can achieve improved efficiency by automatically learning the optimal common field of view portions of images for use in homograph transformations.

Figure 7:
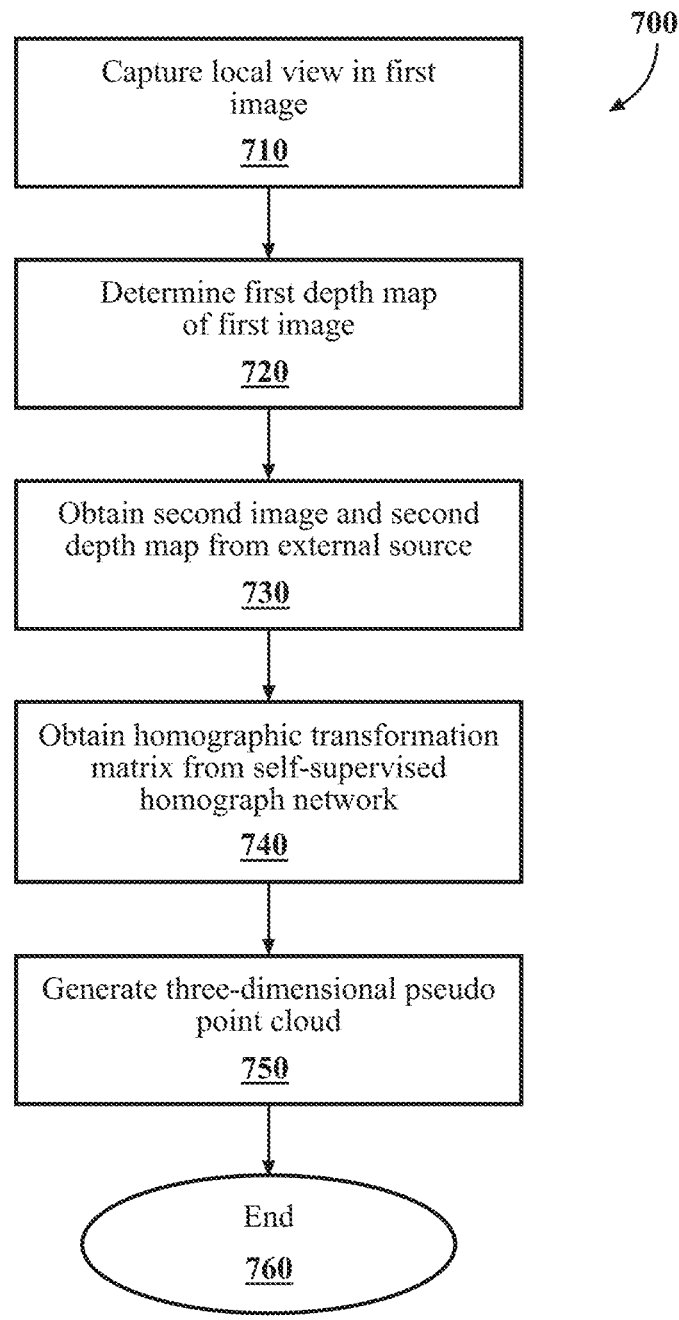
FIG. 7 illustrates an example flowchart of operations of a 3D point cloud system, according to the disclosed embodiments.

FIG. 7 illustrates a flowchart of a method 700 of dynamically generating a 3D pseudo point cloud of an environment according to the disclosed embodiments. Method 700 will be discussed from the perspective of the 3D point cloud system 170 of FIGS. 1 and 2. While method 700 is discussed in combination with the 3D point cloud system 170, it should be appreciated that the method 700 is also not limited to being implemented within the 3D point cloud system 170 but is instead one example of a system that may implement the method 700. Furthermore, in various implementations some of the operations may be executed in a different order from the order in which they are discussed or optionally omitted.

At operation 710, the 3D point cloud system 170 captures, via camera(s) 126, a first view in a first image. In one or more embodiments, the first image is a local view (e.g., front-facing view) of an environment around the ego vehicle 100.

At operation 720, the 3D point cloud system 170 determines a first depth map based on the first image. The first depth map can be extracted from the first image using any conventional technique.

At operation 730, the 3D point cloud system 170 (e.g., communications module 220) obtains, from an external system (e.g., a connected vehicle), a second image of a second view that overlaps the first view and a second depth map based on the second image. For example, in one or more implementations a connected vehicle in communication with the ego vehicle 100 and traveling in a lane adjacent to the ego vehicle captures the second image from a front-facing camera, extracts the second depth map from the second image using any conventional technique, and transmits the second image and the second depth map to the ego vehicle 100.

In one or more embodiments, the communications module 220 can periodically transmit requests for images/depth maps from nearby connected vehicles in an on-going basis (e.g., one, two, or five requests per second, etc.). In one or more embodiments, the connected vehicles transmit GPS/IMU data associated with the images/depth maps transmitted to the ego vehicle, thereby providing additional information about the location of the camera that captured the images relative to the ego vehicle 100.

At operation 740, the 3D point cloud system 170 (e.g., homograph module 230) obtains a homographic transformation matrix by inputting the first image and the second image into a self-supervised homograph network that is trained to output a homographic transformation matrix between the first image and the second image. In one or more embodiments, the self-supervised homograph network includes a spatial self-attention network configured to receive the first image and the second image as input and determine a feature vector that is an optimal representation of differences between the first image and the second image, and a vector regression network configured to receive the feature vector as input and, based on the feature vector, output a translation vector and a rotation vector. In one or more embodiments, the self-supervised homograph network determines the homographic transformation matrix based on the translation vector and the rotation vector.

In one or more embodiments, the self-supervised homograph network is trained in an end-to-end training regimen based on reducing a photometric loss between pairs of images in a training set.

In one or more embodiments, the spatial self-attention network determines the feature vector by convolving each inputted image through a plurality of convolution stages in a plurality of convolution layers, at each convolution stage, determining difference features that indicate differences between the first image and the second image, and combining the difference features into a single vector which forms the feature vector.

In one or more embodiments, the spatial self-attention network includes a transformer model to learn which parts of the first image and the second image are optimal for use in transformation estimation and uses those optimal parts while ignoring other parts of the first image and the second image in determining the homographic transformation matrix.

At operation 750, the 3D point cloud system 170 (e.g., pseudo point cloud module 240) generates a three-dimensional pseudo point cloud that combines the first depth map and the second depth map based on the homographic transformation matrix. The process ends at 760.

In one or more embodiments, as shown in FIG. 3, the 3D point cloud system 170 can receive, from another external system (e.g., a second connected vehicle), a third image of a third view that overlaps the first view and a third depth map based on the third image, input the first image and the third image into the self-supervised homograph network, and augment the pseudo point cloud to achieve a still wider FoV by combining the third depth map according to a second homographic transformation matrix outputted based on the first image and the third image. In one or more embodiments, by receiving multiple images from multiple connected vehicles the 3D point cloud system 170 can generate a complete 360 degree 3D pseudo point cloud encircling a position of the ego vehicle 100.

Accordingly, the disclosed 3D point cloud system 170 can vastly improve vehicle operations (e.g., related to path-finding, immediate navigation, obstacle collision avoidance, etc.) by efficiently generating a 3D representation of a wider FOV of a driving environment compared to conventional sensing systems and without relying on a LIDAR system.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can implement the database 119 (FIG. 2) and can further include map data 116. The map data 116 can include maps of one or more geographic areas. In some instances, the map data 116 can include information or data on roads, road-side unit locations, traffic control devices, road markings, structures, obstructions, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high definition, high quality and/or highly detailed in one or more areas, and have one or more areas that have less detail, information or quality than the one or more high quality areas.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself, such as one or more actual states of the vehicle 100 as discussed above. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof and can also be included in the pseudo point cloud data 270. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126, e.g., one or more monocular cameras. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger).

The vehicle 100 can include an output system 135. An "output system" includes any device, component, or arrangement or groups thereof that enable information/data to be presented to a vehicle passenger (e.g., a person, a vehicle passenger, etc.). The output system 135 can function as part of an interface that can present, for example, predicted states of detected objects.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed. One or more of these systems can be operably connected to wheels of the vehicle in a manner that allows individual application of control or commands implemented by the respective system.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the 3D point cloud system 170, and/or the autonomous driving module(s) 160 can be operatively connected to communicate with the various vehicle systems 140 and/or individual components thereof. For example, returning to FIG. 1, the processor(s) 110, the 3D point cloud system 170, and/or the autonomous driving module(s) 160 can be in communication to send and/or receive information from the various vehicle systems 140 to control the movement, speed, maneuvering, heading, direction, etc. of the vehicle 100. The processor(s) 110 and/or the autonomous driving module(s) 160 may control some or all of these vehicle systems 140 and, thus, may be partially or fully autonomous.

The processor(s) 110, the 3D point cloud system 170, and/or the autonomous driving module(s) 160 may be operable to communicate with and/or control the navigation and/or maneuvering of the vehicle 100 by controlling one or more of the vehicle systems 140 and/or components thereof. For instance, when operating in an autonomous mode, the processor(s) 110, the 3D point cloud system 170, and/or the autonomous driving module(s) 160 can control the direction and/or speed of the vehicle 100 in response to or based at least in part on predicted states of objects in the environment as provided by the 3D point cloud system 170. In one or more embodiments, the processor(s) 110, the 3D point cloud system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities. The 3D point cloud system 170 can determine one or more actuation commands for one or more of the actuators 150 on a per wheel basis, as discussed above.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the 3D point cloud system 170 can be configured to determine travel path(s) and determine current autonomous driving maneuvers for the vehicle 100, future autonomous driving maneuvers and/or modifications to current autonomous driving maneuvers based on data and/or predictions acquired by the sensor system 120 and/or 3D point cloud system 170, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement a variety of driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for a vehicle, comprising:
   a processor; and
   and a memory storing machine-readable instructions that, when executed by the processor, cause the processor to:
      capture, via a front-facing camera, a first view in a first image;
      determine a first depth map based on the first image;
      obtain, from a ground-based vehicle, a second image of a second view that overlaps the first view and a second depth map based on the second image, wherein the second image was produced by a front-facing camera of the ground-based vehicle;
      input the first image and the second image into a self-supervised homograph network that is trained to output a homographic transformation matrix between the first image and the second image; and
      generate a three-dimensional pseudo point cloud that combines the first depth map and the second depth map based on the homographic transformation matrix.

2. The system of claim 1, wherein the self-supervised homograph network includes:
   a spatial self-attention network configured to receive the first image and the second image as input and determine a feature vector that is an optimal representation of differences between the first image and the second image; and
   a vector regression network configured to receive the feature vector as input and, based on the feature vector, output a translation vector and a rotation vector,
   wherein the self-supervised homograph network determines the homographic transformation matrix based on the translation vector and the rotation vector.

3. The system of claim 2, wherein the self-supervised homograph network is trained in an end-to-end training regimen based on reducing a photometric loss between pairs of images in a training set.

4. The system of claim 2, wherein the spatial self-attention network determines the feature vector by:
   convolving each inputted image through a plurality of convolution stages in a plurality of convolution layers,
   at each convolution stage, determining difference features that indicate differences between the first image and the second image, and
   combining the difference features into a single vector which forms the feature vector.

5. The system of claim 2, wherein the spatial self-attention network includes a transformer model to learn which parts of the first image and the second image are optimal for use in transformation estimation and uses those optimal parts while ignoring other parts of the first image and the second image in determining the homographic transformation matrix.

6. The system of claim 1, wherein:
the self-supervised homograph network is trained to estimate relative poses of cameras that captured the first image and the second image; and
the homographic transformation matrix includes a rotation vector and a translation vector expressing a difference in camera poses.

7. The system of claim 1, wherein the memory further stores machine-readable instructions that, when executed by the processor, cause the processor to:
obtain, from a ground-based external system, a third image of a third view that overlaps the first view and a third depth map based on the third image, wherein the third image was produced by a camera of the ground-based external system;
input the first image and third image into the self-supervised homograph network; and
augment the pseudo point cloud by combining the third depth map according to a second homographic transformation matrix outputted based on the first image and the third image.

8. A method, comprising:
capturing, via a front-facing camera, a first view in a first image;
determining a first depth map based on the first image;
obtaining, from a ground-based vehicle, a second image of a second view that overlaps the first view and a second depth map based on the second image, wherein the second image was produced by a front-facing camera of the ground-based vehicle;
inputting the first image and the second image into a self-supervised homograph network that is trained to output a homographic transformation matrix between the first image and the second image; and
generating a three-dimensional pseudo point cloud that combines the first depth map and the second depth map based on the homographic transformation matrix.

9. The method of claim 8, further comprising outputting the homographic transformation matrix by:
inputting the first image and the second image to a spatial self-attention network configured to determine a feature vector that is an optimal representation of differences between the first image and the second image;
inputting the feature vector to a vector regression network configured to output, based on the feature vector, a translation vector and a rotation vector; and
determining the homographic transformation matrix based on the translation vector and the rotation vector.

10. The method of claim 9, further comprising training the self-supervised homograph network in an end-to-end training regimen based on reducing a photometric loss between pairs of images in a training set.

11. The method of claim 9, further comprising determining the feature vector by:
convolving each inputted image through a plurality of convolution stages in a plurality of convolution layers of the spatial self-attention network;
at each convolution stage, determining difference features that indicate differences between the first image and the second image; and
combining the difference features into a single vector which forms the feature vector.

12. The method of claim 9, further comprising:
using a transformer model to learn which parts of the first image and the second image are optimal for use in transformation estimation, and
using those optimal parts while ignoring other parts of the first image and the second image in determining the homographic transformation matrix.

13. The method of claim 8, further comprising training the self-supervised homograph network to estimate relative poses of cameras that captured the first image and the second image such that the homographic transformation matrix includes a rotation vector and a translation vector expressing a difference in camera poses.

14. The method of claim 8, further comprising:
obtaining, from a ground-based external system, a third image of a third view that overlaps the first view and a third depth map based on the third image, wherein the third image was produced by a camera of the ground-based external system;
inputting the first image and third image into the self-supervised homograph network; and
augmenting the pseudo point cloud by combining the third depth map according to a second homographic transformation matrix outputted based on the first image and the third image.

15. A non-transitory computer-readable medium including instructions that, when executed by one or more processors, cause the one or more processors to:
capture, via a front-facing camera, a first view in a first image;
determine a first depth map based on the first image;
obtain, from a ground-based vehicle, a second image of a second view that overlaps the first view and a second depth map based on the second image, wherein the second image was produced by a front-facing camera of the ground-based vehicle;
input the first image and the second image into a self-supervised homograph network that is trained to output a homographic transformation matrix between the first image and the second image; and
generate a three-dimensional pseudo point cloud that combines the first depth map and the second depth map based on the homographic transformation matrix.

16. The non-transitory computer-readable medium of claim 15, further comprising instructions to output the homographic transformation matrix by:
inputting the first image and the second image to a spatial self-attention network configured to determine a feature vector that is an optimal representation of differences between the first image and the second image;
inputting the feature vector to a vector regression network configured to output, based on the feature vector, a translation vector and a rotation vector; and
determining the homographic transformation matrix based on the translation vector and the rotation vector.

17. The non-transitory computer-readable medium of claim 16, further comprising instructions to train the self-supervised homograph network in an end-to-end training regimen based on reducing a photometric loss between pairs of images in a training set.

18. The non-transitory computer-readable medium of claim 16, further comprising instructions to determine the feature vector by:
convolving each inputted image through a plurality of convolution stages in a plurality of convolution layers of the spatial self-attention network;
at each convolution stage, determining difference features that indicate differences between the first image and the second image; and
combining the difference features into a single vector which forms the feature vector.

19. The non-transitory computer-readable medium of claim 16, further comprising instructions to:
- use a transformer model to learn which parts of the first image and the second image are optimal for use in transformation estimation; and
- use those optimal parts while ignoring other parts of the first image and the second image in determining the homographic transformation matrix.

20. The non-transitory computer-readable medium of claim 15, further comprising instructions to train the self-supervised homograph network to estimate relative poses of cameras that captured the first image and the second image such that the homographic transformation matrix includes a rotation vector and a translation vector expressing a difference in camera poses.

* * * * *